United States Patent [19]
MacAlpine et al.

[11] Patent Number: 5,840,186
[45] Date of Patent: Nov. 24, 1998

[54] LIQUID FILTRATION APPARATUS

[75] Inventors: Peter Bruce MacAlpine; Graeme Michael Wigg, both of Preston, United Kingdom

[73] Assignee: British Nuclear Fuels plc, United Kingdom

[21] Appl. No.: 640,908

[22] PCT Filed: Sep. 12, 1995

[86] PCT No.: PCT/GB95/02146

§ 371 Date: May 9, 1996

§ 102(e) Date: May 9, 1996

[87] PCT Pub. No.: WO96/08307

PCT Pub. Date: Mar. 21, 1996

[30] Foreign Application Priority Data

Sep. 15, 1994 [GB] United Kingdom .................. 9418578

[51] Int. Cl.⁶ .................................................. B01D 63/00
[52] U.S. Cl. ................................ 210/321.79; 210/321.78; 210/323.2; 210/330; 210/336; 210/456
[58] Field of Search ............................ 210/321.79, 321.8, 210/323.2, 330, 336, 341, 456, 343

[56] References Cited

U.S. PATENT DOCUMENTS

| | | | |
|---|---|---|---|
| 3,355,382 | 11/1967 | Huntington | 210/321.9 |
| 3,612,282 | 10/1971 | Cheng | 210/321.9 |
| 4,704,205 | 11/1987 | Ishii | 210/323.2 |
| 4,732,673 | 3/1988 | Dagard et al. | 210/247 |
| 4,784,768 | 11/1988 | Mathieu | 210/323.2 |
| 4,897,191 | 1/1990 | Langerak et al. | 210/321.9 |
| 4,949,551 | 8/1990 | Borgione | 210/323.2 |
| 5,141,640 | 8/1992 | Sasajima et al. | 210/321.79 |
| 5,169,530 | 12/1992 | Schucker et al. | 210/321.9 |

FOREIGN PATENT DOCUMENTS

| | | |
|---|---|---|
| 0127685 | 12/1984 | European Pat. Off. . |
| 1054774 | 1/1967 | United Kingdom . |
| 1256491 | 12/1971 | United Kingdom . |
| 1382464 | 1/1975 | United Kingdom . |
| 2006639 | 5/1979 | United Kingdom . |
| 2056313 | 3/1981 | United Kingdom . |

*Primary Examiner*—Ana Fortuna
*Attorney, Agent, or Firm*—Sheridan Ross P.C.

[57] ABSTRACT

A filter for treating liquids comprises an elongate housing having a liquid inlet port, an outlet port for concentrated liquid and a permeate discharge port. Extending through the housing is a parallel array of filter tubes, each having a permeable wall so that permeate passes into a common chamber defined by the housing. Manifold members, located at each end of the housing, are provided with channel means which communicate with the ends of the tubes. In use, the channel means direct the liquid along at least three passes through the tubes, the volume of liquid being reduced between the first and final passes so as to maintain the desired flow velocity. Each pass comprises a group of tubes, and the liquid may pass through seven or eleven groups of tubes.

23 Claims, 7 Drawing Sheets

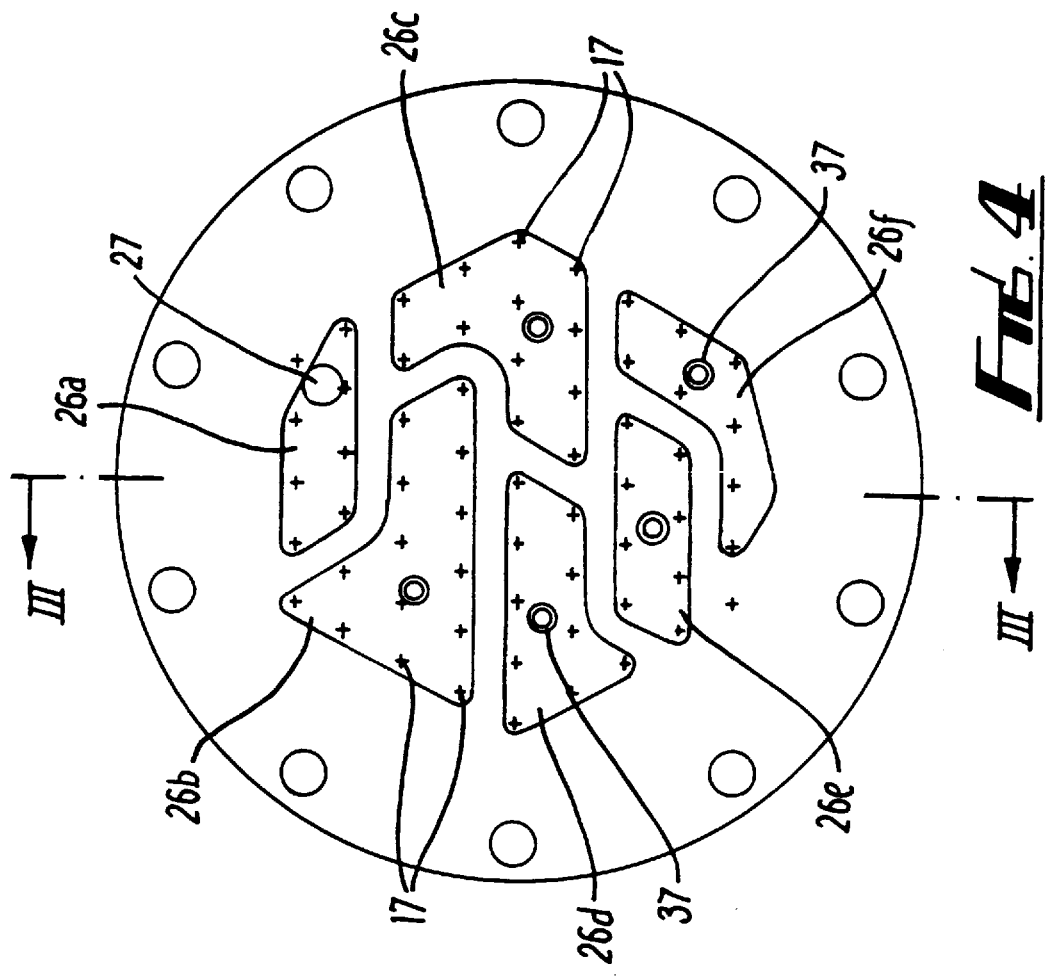
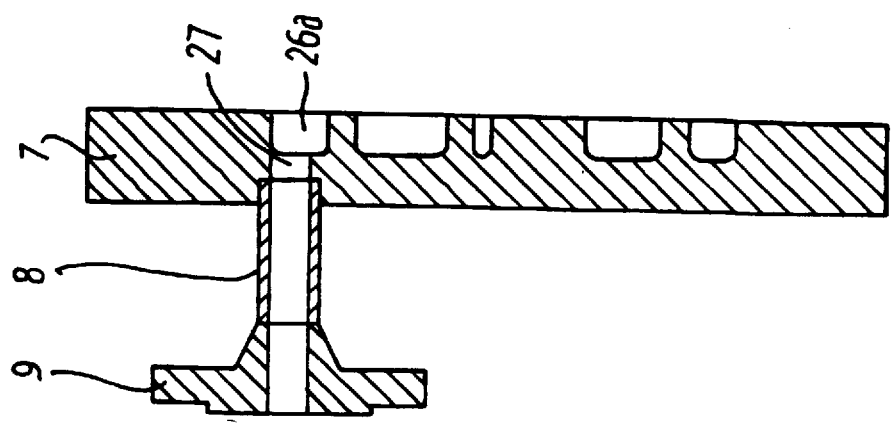

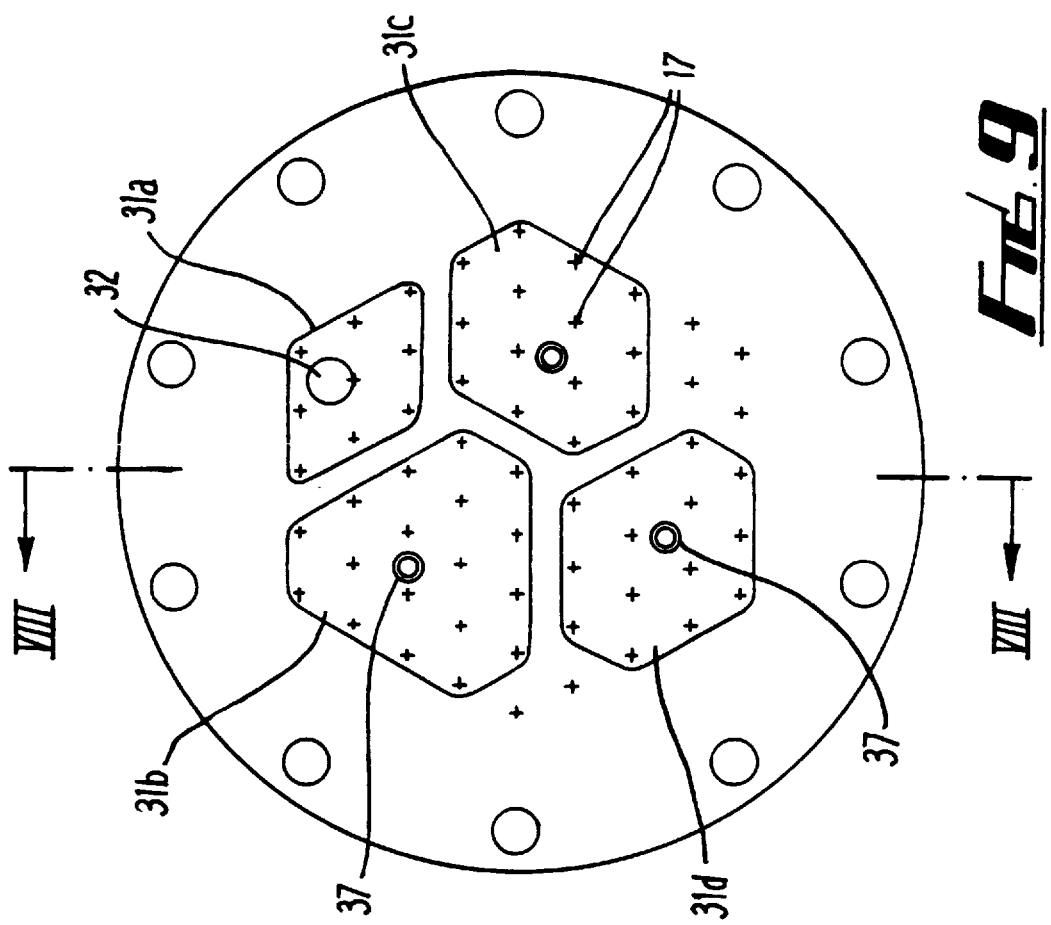
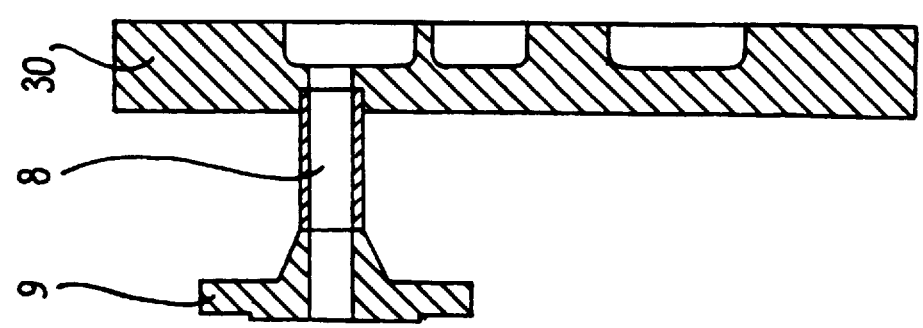

LIQUID FILTRATION APPARATUS

This invention relates to apparatus for the filtration of liquids. In particular, the invention relates to a cross-flow filtration apparatus of the type comprising a plurality of membrane tubes, each having a wall permeable to at least one component of the liquid undergoing treatment.

A filter of this type for dewatering a radioactive sludge is described in GB Patent No 2180775. The filter comprises a housing which surrounds a plurality of parallel membrane tubes arranged in two groups, each group containing an equal number of tubes. In use, a sludge to be treated passes along one group of tubes, the flow then being reversed so that the sludge passes back through the other group of tubes to be discharged from the filter. The discharged sludge is more concentrated than the inflowing sludge as some of the water permeate passes through the walls of the tubes into the housing.

A disadvantage of this known filter arrangement is that it is limited in the amount of permeate that can be removed from the sludge.

According to the present invention there is provided apparatus for the filtration of a liquid, the apparatus comprising an elongate housing having an inlet port for liquid to be treated, an outlet port for concentrated liquid and a discharge port for permeate liquid, a plurality of parallel tubes extending through said housing, each tube having a wall permeable to at least one component of the liquid undergoing treatment such that the permeate passes through said wall into a common chamber defined by said housing for discharge through said discharge port, and channel means provided at each end of the tubes, the channel means being in communication with the tubes and disposed so as to direct the liquid along at least three successive passes through the tubes, the arrangement being such that the volume of liquid in a first of said passes is greater than the volume of liquid in a final one of said passes.

The channel means may be disposed so as to direct the liquid along at least seven successive passes. In one embodiment of the invention the channel means may be disposed so as to direct the liquid along eleven successive passes.

Desirably, the first pass of liquid is made through a first group of tubes arranged to receive liquid from said inlet port, an intermediate pass of liquid being made through an intermediate group of tubes and the final pass of liquid being made through a final group of tubes arranged to direct liquid towards said outlet port.

In a preferred embodiment the tubes each have substantially the same internal diameter, the number of tubes in the first group being greater than the number of tubes in the final group.

Preferably, the number of tubes in said intermediate group of tubes is less than the number of tubes in the first group and greater than the number of tubes in the final group, whereby the volume of liquid passing through the intermediate group of tubes is less than the volume of liquid passing through the first group of tubes and greater than the volume of liquid passing through the final group of tubes.

A manifold member may be provided at each end of the housing, each manifold member having a surface adjacent to the ends of the tubes, the channel means being formed in said surface and communicating with a plurality of said tubes.

In a preferred arrangement the inlet port is provided in a manifold member at an inlet end of the housing and the outlet port is provided in the other manifold member at an outlet end of the housing.

Advantageously the inlet port communicates with a channel means which encompasses the ends of the group of tubes forming the first pass, the remaining channel means at said inlet end each encompassing the ends of two groups of tubes forming two successive passes.

The outlet port may communicate with a channel means which encompasses the ends of the group of tubes forming the final pass, the remaining channel means at said outlet end each encompassing the ends of two groups of tubes forming two successive passes.

Preferably the housing comprises a cylindrical shell having an end plate at each end thereof, a plurality of throughbores being provided in each of said end plates for receiving a respective end of a tube, and wherein each manifold member is mounted on a respective end plate at a side thereof remote from said shell.

Advantageously each manifold member is removably mounted to enable replacement thereof by a manifold member having a channel means of a different profile, whereby the member of tubes in each group can be altered.

Pressure measuring means may be provided on the manifold members so as to communicate with at least some of the channels.

The tubes may be arranged in rows to form a hexagonal array.

The tubes are preferably supported by a frame structure which comprises a plurality of plates attached to the housing at intervals therealong and extending transversely with respect to the tubes. The frame structure may further comprise a plurality of perforated support cylinders extending between the plates and surrounding at least some of the tubes.

Preferably a precoating material, which may comprise $U_3O_8$, is applied to the internal surfaces of the tubes.

Embodiments of the invention will now be further described by way of example, with reference to the accompanying drawings, in which:

FIG. 1 shows a longitudinal part sectional view through a cross-flow filtration apparatus embodying the invention, FIG. 2 shows a cross-sectional end view taken on the line II—II of FIG. 1, FIGS. 3 and 4 show, respectively, a cross-sectional view on the line III—III in FIG. 4 and an elevation of an inlet manifold for the filtration apparatus shown in FIGS. 1 and 2, according to one embodiment of the invention, FIG. 5 and 6 show, respectively, an elevation and a cross-sectional view on the line VI—VI in FIG. 5 of an outlet manifold for the filtration apparatus shown in FIGS. 1 and 2, according to said one embodiment of the invention;

FIGS. 8 and 9 show, respectively, a cross-sectional view on the line VIII—VIII in FIG. 9 and an elevation of an inlet manifold for the filtration apparatus shown in FIGS. 1 and 2 according to a further embodiment of the invention;

Figure 11:
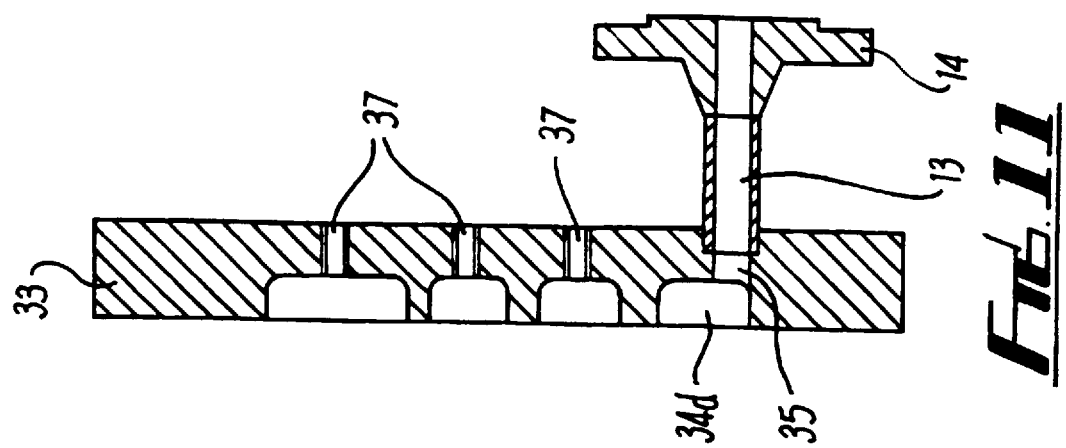
Figure 10:
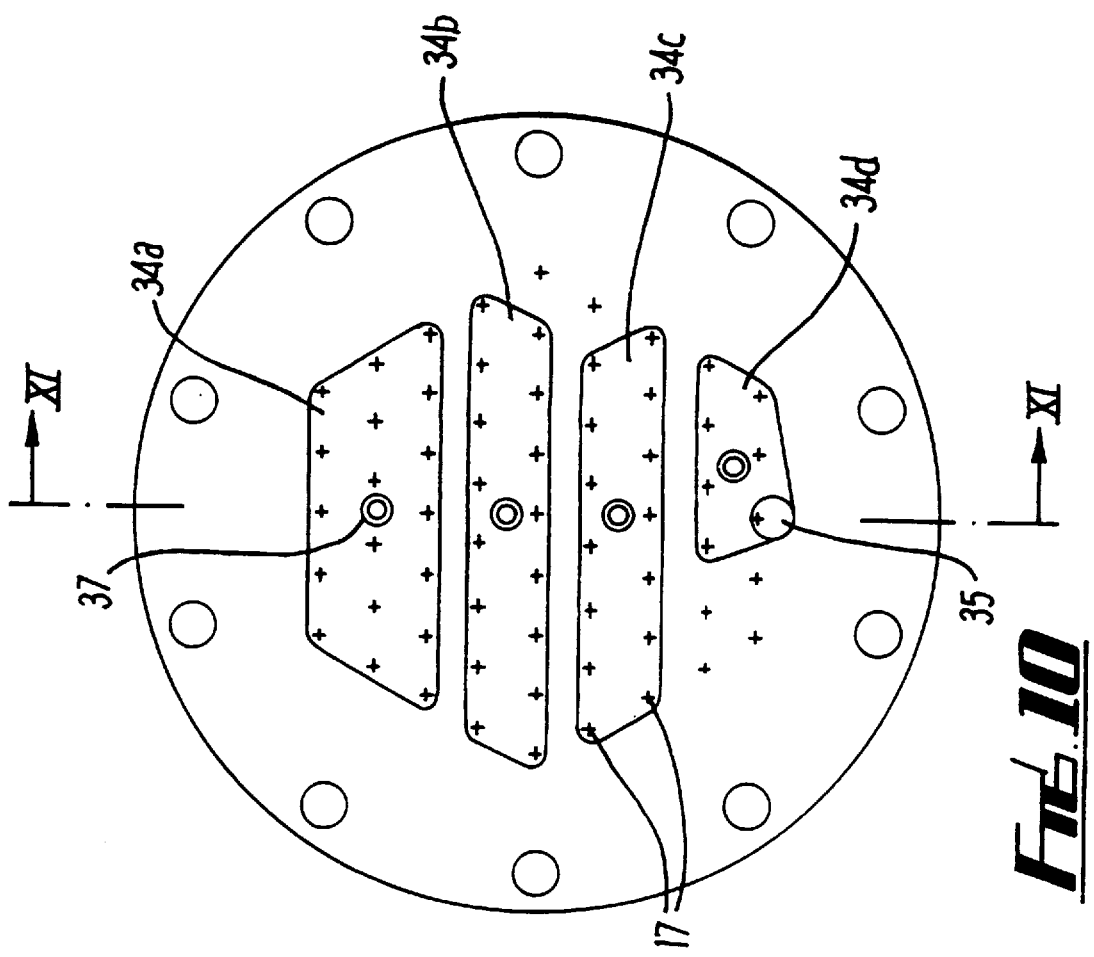
Figure 12:
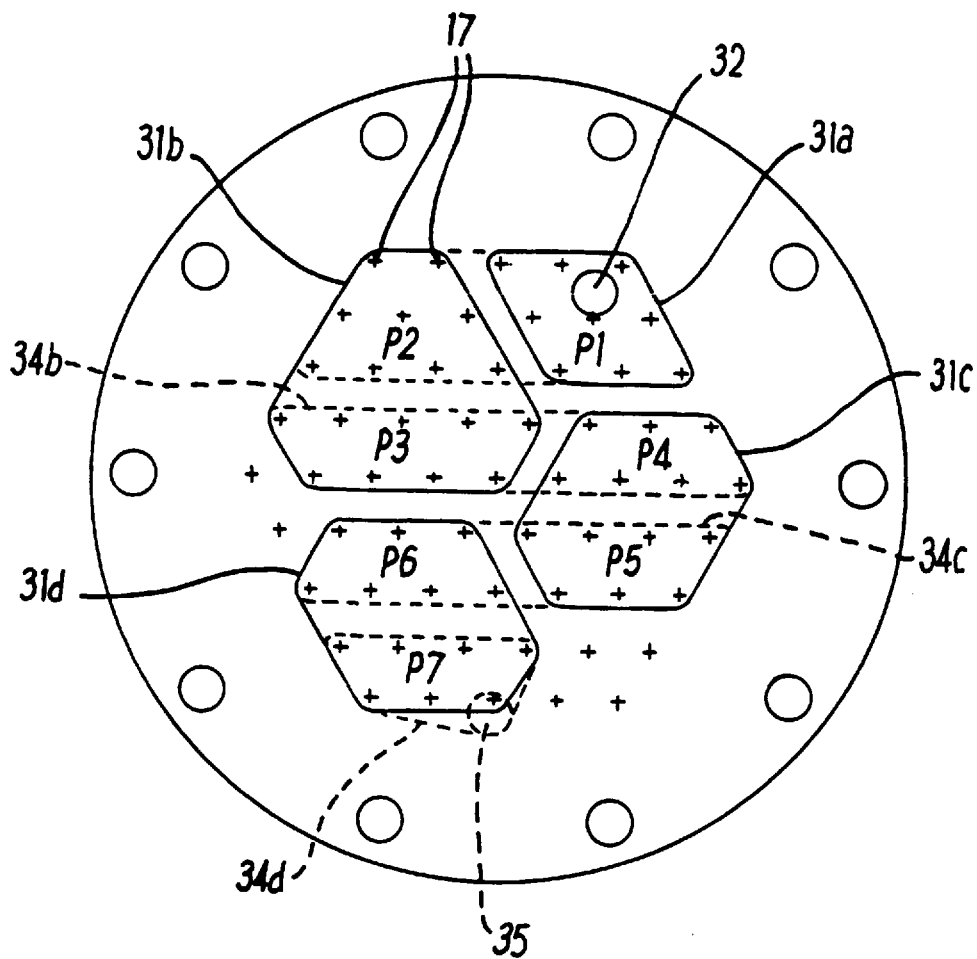

FIGS. 10 and 11 show, respectively, an elevation and a cross-sectional end view on the line XI—XI in FIG. 10 of an outlet manifold for the filtration apparatus according to said further embodiment of the invention, and FIG. 12 shows the inlet manifold illustrated in FIGS. 8 and 9 with the liquid diverting channels of the outlet manifold of FIGS. 10 and 11 superimposed thereon.

Figure 1:
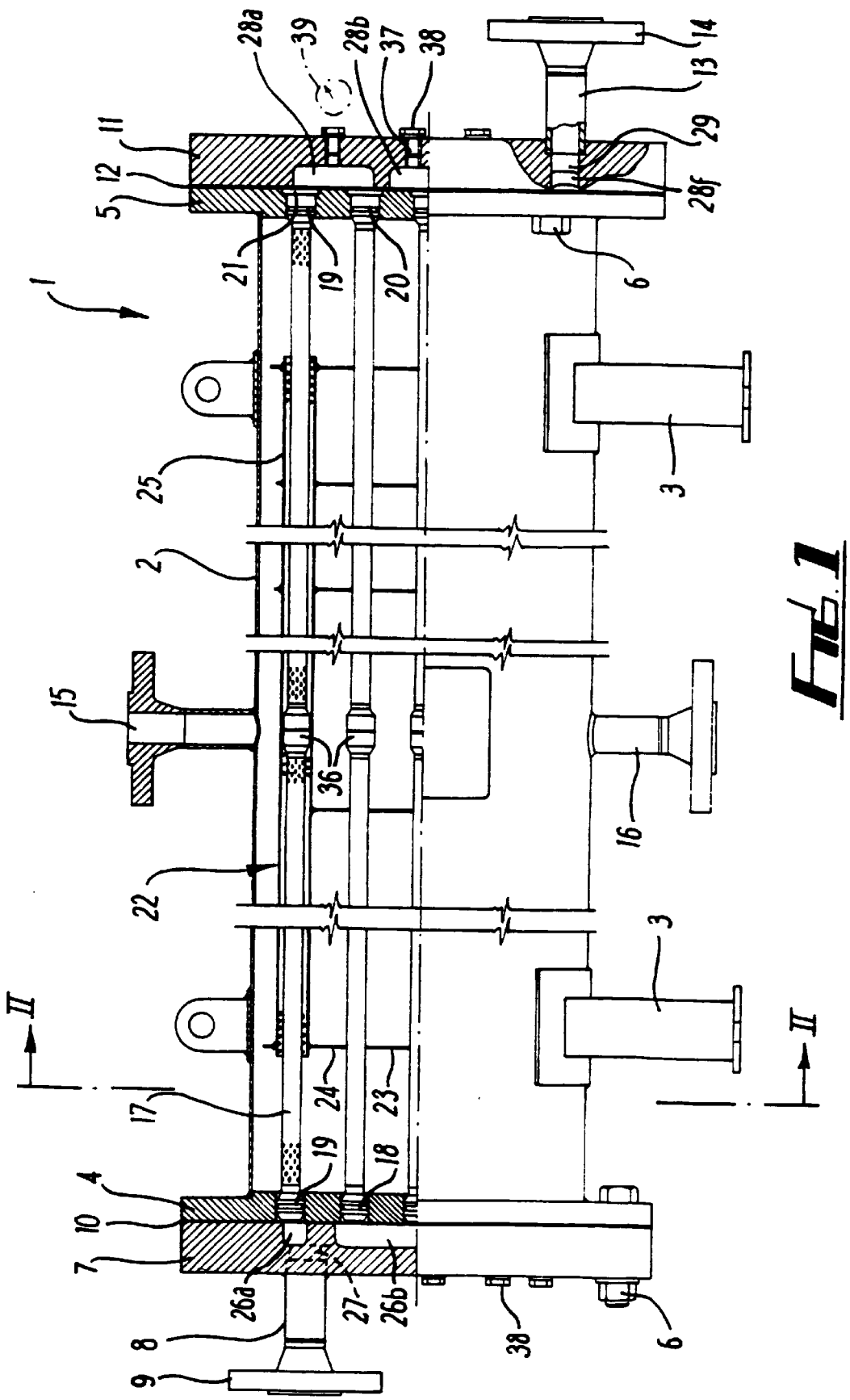

Referring to FIG. 1, a cross-flow filtration apparatus 1 is shown for treating a liquid. The filtration apparatus is particularly suitable, though not exclusively, for dewatering a slurry discharged from a nuclear fuel pellet grinding apparatus, the aqueous permeate obtained from the filtration apparatus 1 being recycled to the grinding apparatus to serve as a cooling liquid. Such a system is described in European Patent Application No 0469764, filed by the Applicant.

The apparatus 1 includes a stainless steel cylindrical housing 2 comprising a cylindrical shell arranged with its longitudinal axis horizontal and mounted on two supports 3 welded to the housing. An end plate 4 is provided at an inlet end of the housing 2 and an end plate 5 is provided at an outlet end of the housing 2. Attached to the end plate 4 by ten equi-angularly spaced nut and bolt assemblies 6 is an inlet manifold 7. Slurry to be treated is admitted to the filtration apparatus 1 through an inlet pipe 8 extending from the inlet manifold 7. An inlet flange 9 is provided on the inlet pipe 8 for connection to slurry feed piping. A gasket seal 10 is clamped between the inlet manifold 7 and the end plate 4.

An outlet manifold 11 is connected to the end plate 5 by ten equi-angularly spaced nut and bolt assemblies 6, a gasket seal 12 being clamped between the manifold and the end plate. Concentrated slurry is discharged from the filtration apparatus 1 through an outlet pipe 13 extending from the outlet manifold 11. An outlet flange 14 is provided on the end of the outlet pipe 13 for connection to slurry discharge piping.

Positioned mid-way along the upper side of the housing 2 is an outlet duct 15 for permeate to leave the housing, while on the underside of the housing, diametrically opposite to the outlet duct 15, is a drain outlet 16.

The end plates 4, 5 are provided with a plurality of throughbores, each of which seats an end of a membrane tube 17. Each end of the membrane tubes 17 at the inlet end of the apparatus is provided with a seating 18 which seals to the throughbore by means of an O-ring 19. Similarly, each end of the membrane tubes 17 at the outlet end of the apparatus is provided with a seating 20, sealed to the throughbore by means of an O-ring 19. Each of the seatings 20 is provided at its outer end with a shoulder 21, which is received in an enlarged diameter portion of the througbore to axially locate the tube 17. All of the tubes 17 have the same internal diameter and each is preferably formed from a sintered stainless steel and has a layer of pre-coating material applied to its internal surface.

Figure 2:
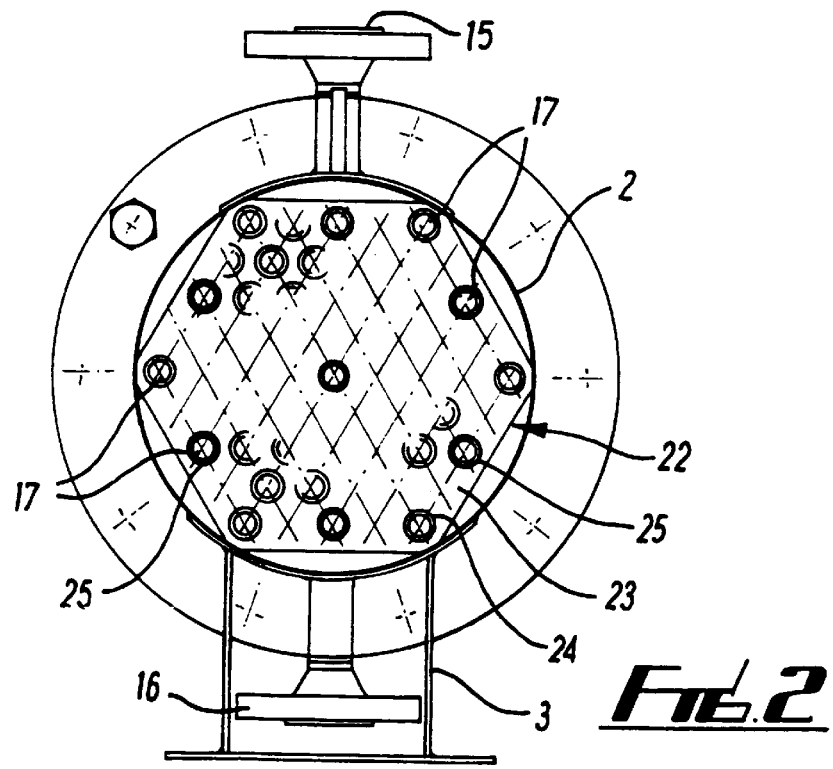

Preferably, there are 61 tubes 17 arranged in a hexagonal array, as seen in FIG. 2. For clarity, only 13 tubes have been shown in this Figure, but, in practice, a tube 17 is provided at each intersection of the chain dot lines. Thus, there are nine horizontal rows of tubes 17, the tubes numbering in each row, successively from the top row to the bottom row, as follows: 5, 6, 7, 8, 9, 8, 7, 6, 5.

The tubes 17 are supported within the cylindrical housing 2 by a fabricated support frame 22. The frame 22 comprises a plurality of spaced transverse hexagonal plates 23 welded to the internal surface of the housing 2. Holes 24 are drilled in the plates 23 to allow the tubes 17 to pass through. Some of these holes 24, typically six, are of increased diameter so as to receive perforated support cylinders 25 which surround the tubes 17. An adaptor 36 located at a mid-position along each of the tubes 17 is closely surrounded by the cylinder 25 so as to provide support for the tube.

The ends of the tubes 17 supported in the end plate 4 communicate with channels 26a, 26b, 26c, 26d, 26e, 26f machined in an end surface of the inlet manifold 7. As seen in FIGS. 3 and 4 the channel 26a communicates with the inlet pipe 8 by means of an inlet hole 27 formed in the inlet manifold 7. In a preferred embodiment there are six channels 26a, 26b, 26c, 26d, 27e, 26f, each of which is profiled so as to encompass and communicate with the ends of selected groups of the tubes 17. The centres of the tubes are indicated by crosses. Thus, channel 26a communicates with seven tubes, channel 26b with fourteen tubes, channel 26c with twelve tubes, channel 26d with ten tubes and channels 26e and 26f each communicates with eight tubes. With this particular arrangement two of the tubes 17 are not utilised.

Figure 6:
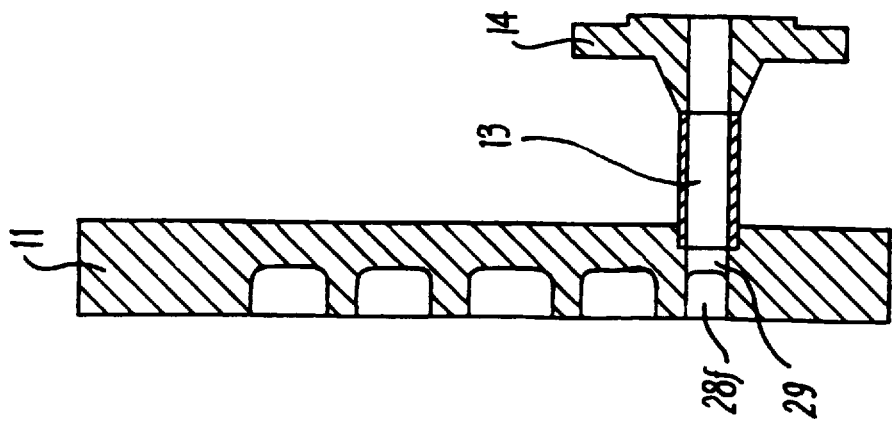
Figure 5:
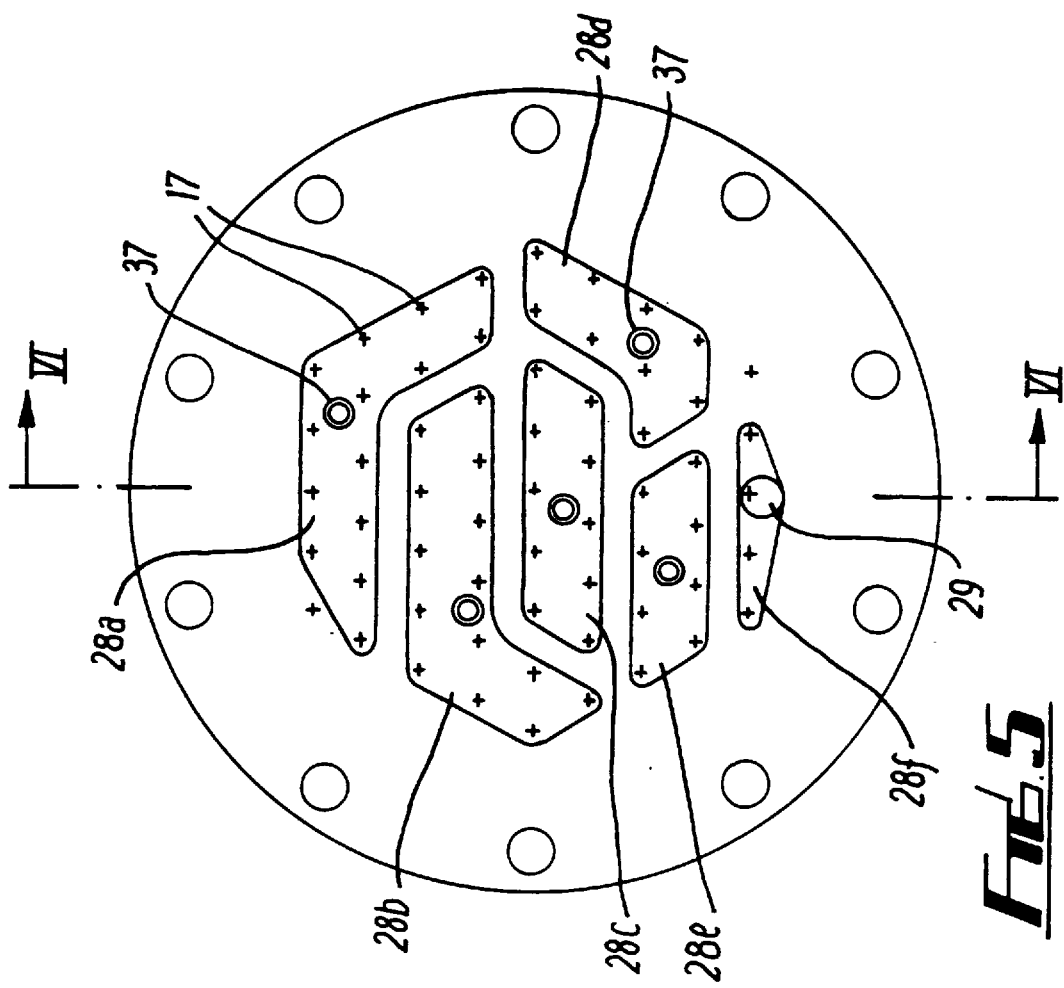

Referring to FIGS. 5 and 6, the outlet manifold 11 is similarly profiled with six channels 28a, 28b, 28c, 28d, 28e, 28f. Channel 28f communicates with the outlet pipe 13 by means of the outlet hole 29 formed in the outlet manifold 11. Each of the channels 28a, 28b, 28c, 28d, 28e, 28f is profiled so as to encompass and communicate with the ends of selected groups of tubes 17, the centres of which are indicated by crosses. Thus, channels 28a and 28b each communicates with fourteen tubes, channel 28c with twelve tubes, channel 28d with ten tubes and channels 28e and 28f each communicates with eight tubes.

Figure 7:
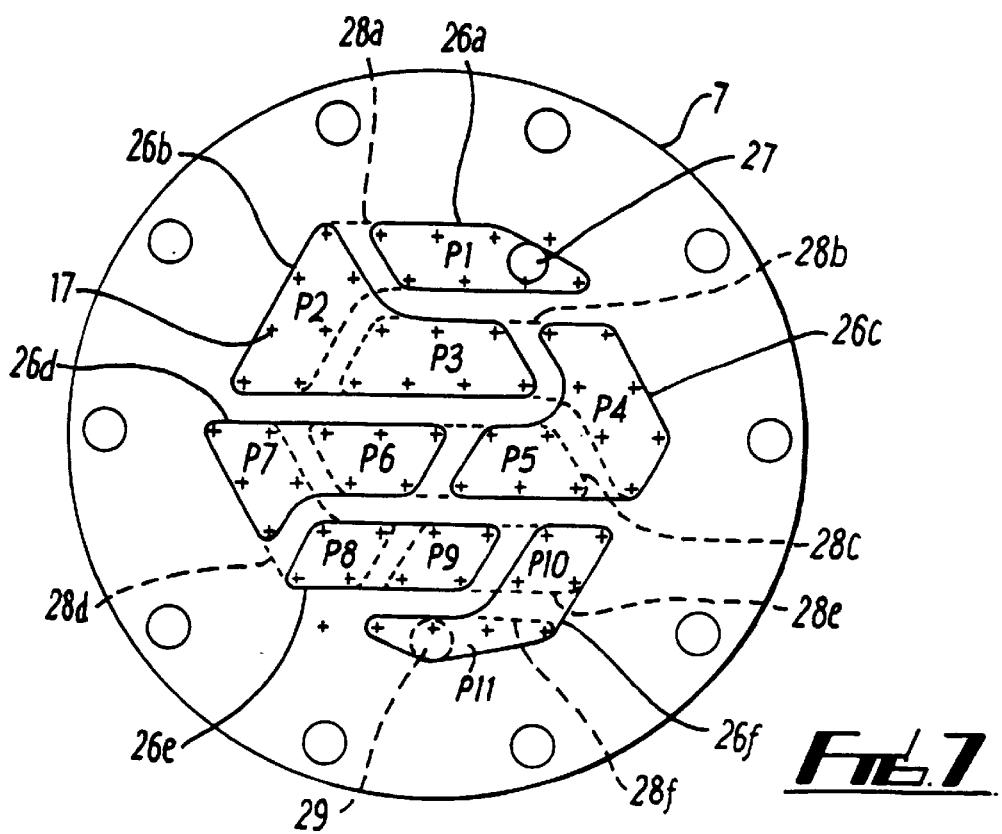
FIG. 7 shows the inlet manifold shown in FIGS. 3 and 4 with the liquid diverting channels of the outlet manifold of FIGS. 5 and 6 superimposed thereon.

FIG. 7 shows a view of the inlet manifold 7 on which the channels 28a, 28b 28c, 28d, 28e, 28f of the outlet manifold 11 have been superimposed, as shown in dotted lines. The channels in each of the inlet and outlet manifolds 7, 11 co-operate to guide the liquid undergoing treatment through successive groups of tubes 17 in a series of eleven passes P1, P2, P3, P4, P5, P6, P7, P8, P9, P10, P11, as hereinafter described.

Before using the apparatus, a feed of particulate material is pumped through the filtration apparatus 1 so as to form a permeable coating on the internal surfaces of the tubes 17. The pre-coating material is selected to suit the liquid undergoing treatment and serves to inhibit rapid blocking of the tubes. For dewatering a slurry discharge from a grinding machine in which uranium dioxide fuel pellets are being processed, a suitable pre-coating material is particulate $U_3O_8$.

After applying the $U_3O_8$ to the tubes, a slurry resulting from the grinding operation is pumped, typically at a pressure of 0.9 bar g and at a feed rate of 50–60 liters/min, to the inlet pipe 8. The slurry passes through the inlet hole 27 of the inlet manifold 7 into the channel 26a. From the channel 26a the slurry is distributed so as to make a first pass P1 (see FIG. 7) along a first group of seven tubes 17 encompassed by the boundary of the channel 26a. At the outlet end of this first group of seven tubes 17, the slurry is directed by the 28a in the outlet manifold 11 to a second group of seven tubes 17, along which the slurry returns to the inlet end as it makes a second pass P2. After making the second pass P2 the slurry is received by the channel 26b in the inlet manifold 7 and directed into a further group of seven tubes 17 to make a third pass P3 towards the outlet manifold 11. The slurry continues to make a further series of to-and-fro passes P4, P5, P6, P7, P8, P9, P10 and P11 along successive groups of tubes 17. After completing eleven passes, the concentrated slurry is discharged from channel 28f in the outlet manifold 11, through the outlet hole 29 into the outlet pipe 13. The number of tubes in each successive group is determined by the boundaries of the associated channels in the inlet and outlet manifolds 7, 11. In pass P4, therefore, a fourth group comprises seven tubes, in passes P5, P6 and P7 there are five tubes in each group, and in passes P8, P9, P10 and P11 there are four tubes in each group.

During each pass some of the water from the slurry passes through the permeable walls of the tubes 2 into a common chamber defined by the housing 2 for discharge through the outlet duct 15. Reducing the number of tubes 17 from eleven in the first pass P1 to four tubes in the final pass P11 results in a consequent reduction of the slurry volume. An intermediate reduction in the volume of slurry is achieved as the slurry makes the passes P5, P6, P7, each of which comprises a group of five tubes. Thus the volume of slurry passing through any one of these intermediate group of tubes is less than the volume of slurry passing through the group of tubes forming the pass P1 and greater than the volume of slurry passing through the group of tubes forming the pass P11. This enables the required slurry velocity to be maintained and ensures that particles do not accumulate on the inner surfaces of the tubes 17. The flow of permeate through the outlet duct 15 may be, typically, 20–30 liters/min, the pressure being nominally atmospheric. If desired, the clean permeate may be recirculated to the fuel pellet grinding machine to serve as a cooling liquid for the grinding wheels.

It will be apparent from the above that the output of the permeate represents in the order of 50% of the incoming feed slurry, which is considerably higher than typical output rates from comparable conventional filters of this type. By causing the slurry to make a plurality of passes through successive groups of tubes located within a single housing enables the apparatus to be formed as a very compact structure. This provides the advantage of a large permeate output per unit volume of the apparatus. For example, for a volume in the region of 50 liters for the housing 2, a permeate output of 20 liters/min can be obtained.

By reducing the volume of slurry between the first and final passes of the apparatus, the desired velocity of the slurry passing through the tubes is maintained. This velocity is such that adequate filtration is sustained while preventing a build up of particles on the inner surfaces of the tubes. Satisfactory filtering efficiency is therefore achieved using low slurry velocities and, in consequence, low pressure drops.

It will be appreciated that the number of passes and the number of tubes in each pass can be readily altered by removing the inlet and outlet manifolds 7, 11 and replacing them with inlet and outlet manifolds provided with different channel profiles. Variations in the number of tubes in each pass can be achieved by using dummy tubes in which blanking plugs have been fitted. This enables the apparatus to be adapted to suit various operating conditions.

Alternative inlet and outlet manifolds designed to provide seven passes of slurry through the filtration apparatus are shown in FIGS. 8, 9, 10 and 11. Referring to FIGS. 8 and 9, an inlet manifold 30 is shown having an inlet pipe 8 and an inlet flange 9. The inlet pipe communicates with a channel 31a by means of an inlet hole 32. The profile of the channel 31a is cut so that, when attached to the housing 2, it encompasses and communicates with nine tubes 17, the centres of which are indicated by crosses. A further channel 31b is profiled so as to encompass eighteen tubes 17, while further channels 31c and 31d are each profiled to encompass fourteen tubes 17. In this particular application six of the tubes installed in the housing 2 are not utilised.

The corresponding outlet manifold 33 is shown in FIGS. 10 and 11. The outlet manifold 33 is provided with an outlet pipe 13 fitted with an outlet flange 14. Four channels 34a, 34b, 34c, 34d are machined in an end surface of the manifold. The channel 34a has a profile which, when the outlet manifold 33 is attached to the housing 2, encompasses eighteen tubes 17, while channels 34b, 34c, 34d encompass sixteen, fourteen and seven tubes, respectively. An outlet hole 35 provides a communication between the channel 34d and the outlet pipe 13.

The inlet and outlet manifolds 30, 33 co-operate to provide seven passes P1, P2, P3, P4, P5, P6, P7 of slurry through the tubes 17, as shown in FIG. 12. For description purposes the channels 34a, 34b, 34c, 34d, shown in broken lines, have been superimposed on the channels 31a, 31b, 31c, 31d of the inlet manifold 30. Slurry to be treated passes through the inlet pipe 8 into the channel 31a by means of the inlet hole 32. From the channel 31a the slurry is distributed into the nine tubes 17 bounded by the channel 31a. The slurry flows through this first group of nine tubes 17 in a first pass P1 towards the outlet manifold 33. At the outlet end of this first group of tubes 17, the slurry is directed by the channel 34a in the outlet manifold 33 to a second group of nine tubes 17 along which the slurry returns in a second pass P2. After completing the second pass P2 the slurry is received by the channel 31b in the inlet manifold 30 and directed by this channel into a further group of nine tubes 17 to make a third pass P3 towards the outlet manifold 33.

The slurry continues to make a further series of passes P4, P5, P6, P7 to-and-fro along successive groups of tubes 17 as directed by the channels provided in the inlet and outlet manifolds 30, 33. In passes P4, P5, P6, P7 there are seven tubes 17 in each group, whereby the volume of slurry is less than that of the slurry making the passes P1, P2, P3, P4. During each pass permeate from the slurry flows through the permeable walls of the tubes 17 into a common chamber defined by the housing 2, to flow out as permeate through the outlet duct 15.

Each channel in the inlet and outlet manifolds at which flow reversal takes place is provided with a screw-threaded hole 37, shown fitted with a blanking plug 38 (see FIG. 1). Removal of the blanking plugs 38 enables pressure gauges 39, only one of which is indicated, to be mounted in each of the holes 37. The pressure gauges can be used to measure the pressure at the flow reversal positions. Signals from the pressure gauges can be transmitted to a control location where a display of the system pressures generates a pass-by-pass pressure loss profile. Thus the prevailing filtration conditions can be assessed to ensure that the flow velocity through the filter is reducing progressively as required. The pressure measurement taken during operation aid the making of on-line tuning adjustments so that the optimum flow velocity distribution can be obtained.

It will be noted that the permeate from all of the filter tubes 17 discharges into a common chamber defined by the housing 2 so that, advantageously, all of the tubes operate at different pressure differentials across the tube walls.

The number of filter tubes 17 in each pass is chosen to maintain the desired flow velocities within the tubes whereby the required mean values of the inlet and outlet velocities for the tubes are achieved. Thus, the number of filter tubes in the groups reduces in accordance with the volume of liquid supplied to the groups. The desired velocity of liquid flow is such that there is no accumulation of solids within the filter tubes and that all solids pass through the filter outlet. Clogging of the filter tubes is thereby avoided. A settling stage may follow the filtration process to recover the solids for further processing.

We claim:

1. An apparatus for the filtration of a liquid comprising an elongate housing having an inlet port for liquid to be treated, an outlet port for concentrated liquid and a discharge port for permeate liquid, a plurality of tubes extending through said housing, each tube having a wall permeable to at least one component of the liquid to be treated such that the permeate passes through said wall into a common chamber defined by the housing for discharge through said discharge port, and channel means provided at each end of the tubes, the channel means being in communication with the tubes and disposed so as to direct the liquid to be treated along at least three successive passes through the tubes, each pass comprising more than one of said plurality of tubes, the arrangement being such that the volumetric rate of liquid flowing in a first of said passes is greater than the volumetric rate of liquid flowing in a final one of said passes, wherein a manifold member is provided at each end of the housing, each manifold member having a surface adjacent to the ends of the tubes, the channel means being formed in said surface and communicating with a plurality of said tubes, wherein the housing comprises a cylindrical shell having an end plate at each end thereof, a plurality of throughbores being provided in each of said end plates for receiving a respective end of a tube, wherein each manifold member is mounted on a respective end plate at a side thereof remote from said shell, and wherein each manifold member is removably mounted to enable replacement thereof by a manifold member having channel means of a different profile whereby the number of tubes in each group can be altered.

2. Apparatus according to claim 1, wherein the channel means are disposed so as to direct the liquid along at least seven successive passes.

3. An apparatus according to claim 1, wherein the channel means are disposed so as to direct the liquid along eleven successive passes.

4. Apparatus according to claim 1, wherein the first pass of liquid is made through a first group of tubes arranged to receive liquid from said inlet port, an intermediate pass of liquid being made through an intermediate group of tubes and the final pass of liquid being made through a final group of tubes arranged to direct liquid towards said outlet port.

5. An apparatus according to claim 4, wherein the tubes each have substantially the same diameter, the number of tubes in the first group being greater than the number of tubes in the final group.

6. An apparatus according to claim 4, wherein the number of tubes in said intermediate group of tubes is less than the number of tubes in the first group and greater than the number of tubes in the final group, whereby the volume of liquid passing through the intermediate group of tubes is less than the volume of liquid passing through the first group of tubes and greater than the volume of liquid passing through the final group of tubes.

7. Apparatus according to claim 1, wherein the inlet port is provided in a manifold member at an inlet end of the housing and the outlet port is provided in the other manifold member at an outlet end of the housing.

8. An apparatus according to claim 7, wherein the housing comprises a cylindrical shell having an end plate at each end thereof, a plurality of throughbores being provided in each of said end plates for receiving a respective end of a tube, and wherein each manifold member is mounted on a respective end plate at a side thereof remote from said shell.

9. Apparatus according to claim 7, wherein the inlet port communicates with a channel means which encompasses the ends of the group of tubes forming the first pass, the remaining channel means at said inlet end each encompassing the ends of two groups of tubes forming two successive passes.

10. Apparatus according to claim 9, wherein the outlet port communicates with a channel means which encompasses the ends of the group of tubes forming the final pass, the remaining channel means at said outlet end each encompassing the ends of two groups of tubes forming two successive passes.

11. An apparatus according to claim 10, wherein the housing comprises a cylindrical shell having an end plate at each end thereof, a plurality of throughbores being provided in each of said end plates for receiving a respective end of tube, and wherein each manifold member is mounted on a respective end plate at a side thereof remote from said shell.

12. An apparatus according to claim 9, wherein the housing comprises a cylindrical shell having an end plate at each end thereof, a plurality of throughbores being provided in each of said end plates for receiving a respective end of a tube, and wherein each manifold member is mounted on a respective end plate at a side thereof remote from said shell.

13. An apparatus according to claim 1, wherein pressure measuring means are provided on the manifold members so as to communicate with at least some of the channel means.

14. An apparatus according to claim 1, wherein the tubes are arranged in rows to form a hexagonal array.

15. An apparatus according to claim 1, wherein the tubes are supported by a frame structure, the frame structure comprising a plurality of plates attached to the housing at intervals there along and extending traversely with respect to said tubes.

16. Apparatus according to claim 15, wherein the frame structure further comprises a plurality of perforates support cylinders extending between the plates and surrounding at least some of the tubes.

17. An apparatus according to claim 1, wherein the tubes comprise a precoating material applied to the internal surface.

18. Apparatus according to claim 17, wherein the precoating material comprises $U_3O_8$.

19. An apparatus according to claim 1, wherein the housing comprises a cylindrical shell having an end plate at each end thereof, a plurality of throughbores being provided in each of said end plates for receiving a respective end of a tube, and wherein each manifold member is mounted on a respective end plate at a side thereof remote from said shell.

20. An apparatus for the filtration of a liquid comprising an elongate housing having an inlet port for liquid to be treated, an outlet port for concentrated liquid and a discharge port for permeate liquid, a plurality of tubes extending through said housing, each tube having a wall permeable to at least one component of the liquid undergoing treatment such that the permeate passes through said wall into a common chamber defined by the housing for discharge through said discharge port, and channel means provided at each end of the tubes, the channel means being in communication with the tubes and disposed so as to direct the liquid along at least three successive passes through the tubes, the arrangement being such that the volumetric rate of liquid flowing in a first of said passes is greater than the volumetric rate of liquid flowing in a final one of said passes, wherein a manifold member is provided at each end of the housing, each manifold member having a surface adjacent to the ends of the tubes, the channel means being formed in said surface and communicating with a plurality of said tubes and wherein pressure measuring means are provided on the manifold members so as to communicate with at least some of the channel means.

21. An apparatus for the filtration of a liquid comprising an elongate housing having an inlet port for liquid to be treated, an outlet part for concentrated liquid and a discharge port for permeate liquid, a plurality of tubes extending through said housing, each tube having a wall permeable to at least one component of the liquid to be treated such that the permeate passes through said wall into a common chamber defined by the housing for discharge through said discharge port, and channel means provided at each end of the tubes, the channel means being in communication with the tubes and disposed so as to direct the liquid to be treated along at least three successive passes through the tubes, each pass comprising more than one of said plurality of tubes, the arrangement being such that the volumetric rate of liquid flowing in a first of said passes is greater than the volumetric rate of liquid flowing in a final one of said passes, wherein a manifold member is provided at each end of the housing, each manifold member having a surface adjacent to the ends of the tubes, the channel means being formed in said surface and communicating with a plurality of said tubes and wherein pressure measuring means are provided on the manifold members so as to communicate with at least some of the channel means.

22. An apparatus for the filtration of a liquid comprising an elongate housing having an inlet port for liquid to be treated, an outlet port for concentrated liquid and a discharge port for permeate liquid, a plurality of tubes extending through said housing, each tube having a wall permeable to at least one component of the liquid to be treated such that the permeate passes through said wall into a common chamber defined by the housing for discharge through said discharge port, and channel means provided at each end of the tubes, the channel means being in communication with the tubes and disposed so as to direct the liquid to be treated along at least three successive passes through the tubes, each pass comprising more than one of said plurality of tubes, the arrangement being such that the volumetric rate of liquid flowing in a first of said passes is greater than the volumetric rate of liquid flowing in a final one of said passes, wherein the tubes comprise a precoating material applied to the internal surface.

23. An apparatus according to claim 17, wherein the precoating material comprises $U_3O_8$.

* * * * *